United States Patent [19]

Kamai

[11] Patent Number: 4,561,295

[45] Date of Patent: Dec. 31, 1985

[54] ENGINE THROTTLE VALVE POSITION DETECTING SYSTEM

[75] Inventor: Kenichiro Kamai, Toyoake, Japan

[73] Assignee: Nippondenso Co., Ltd., Kariya, Japan

[21] Appl. No.: 705,304

[22] Filed: Feb. 25, 1985

[30] Foreign Application Priority Data

Feb. 29, 1984 [JP] Japan .................................. 59-39163

[51] Int. Cl.4 .............................................. G01M 15/00

[52] U.S. Cl. .................................................... 73/117.3

[58] Field of Search .............. 73/118, 116, 115, 117.3; 200/DIG. 17; 123/494

[56] References Cited

U.S. PATENT DOCUMENTS 4,359,894 11/1982 Ikeura et al. .......................... 73/118

FOREIGN PATENT DOCUMENTS 53-13169 2/1978 Japan .

*Primary Examiner*—Jerry W. Myracle

*Attorney, Agent, or Firm*—Cushman, Darby & Cushman

[57] ABSTRACT

An engine throttle valve position detector has a throttle switch formed by a rotary detector member rotatable with the engine throttle valve, a single stationary contact and a single movable contact movable by a guide groove in the rotary detector member into and out of electrical contact with the stationary contact. The stationary and movable contacts are contacted together when the throttle valve is in both fully-closed and fully-open positions, to thereby emit electric signals to an electric control unit which compares the signals with another signal representative of the engine operating condition, such as engine intake air per engine revolution or manifold vacuum, to judge one of the throttle valve fully closed and fully-open positions.

6 Claims, 7 Drawing Figures

ENGINE THROTTLE VALVE POSITION DETECTING SYSTEM

BACKGROUND OF THE INVENTION

1. Field of the Invention

The present invention relates to a throttle valve position detecting system adapted for detecting that a throttle valve provided in the intake pipe of an automotive engine has reached a predetermined position.

2. Description of the Prior Art

A typical conventional throttle valve position detecting system is disclosed in Japanese Pre-Examination Patent Publication No. 53-13169 and has a rotary detector (referred to as "rotor" hereinunder) adapted for rotation with a throttle shaft carrying the throttle valve. The rotor has a guide groove which extends substantially in the direction of rotation of the rotor. The guide groove has a stepped configuration constituting a cam contour such that a movable contact received in this guide groove is displaced radially outwardly and inwardly when the rotor rotates in one and the other directions. A pair of stationary contacts, namely, a first stationary contact for detecting that the throttle valve has reached the fully open position and a second stationary contact for detecting that the throttle valve has reached the fully closed position, are disposed in alignment with the movable contact in the radial direction of the rotor. The movable contact and the two stationary contacts are assembled together to form a unit which will be referred to as "throttle switch" hereinunder.

In operation, when the rotor rotates as a result of the throttle valve operation, the movable contact is moved in the radial direction by the cam action of the guide groove into contact with one of the stationary contacts thus detecting that the throttle valve has reached the fully opened position or the fully close position.

This known throttle valve position detecting system, however, requires a large space for accommodating all three contacts; namely, one movable contact and two stationary contacts. In addition, for connecting these three contacts of the throttle switch to an electronic control unit (referred to as "ECU" hereinunder), the connector on the throttle switch is required to have three terminals. In consequence, the cost and the size of the throttle switch are increased undesirably. Furthermore, three electric lines have to be used to connect the throttle switch to the ECU, resulting in complicated construction of the throttle valve position detecting system.

SUMMARY OF THE INVENTION

Accordingly, an object of the invention is to provide a less-expensive engine throttle valve position detecting system having a simple, compact and lightweight construction.

The engine throttle valve position detecting system according to the present invention comprises a throttle switch operative to produce a first signal, which may preferably be an electrical one, when the engine throttle valve is both in fully-closed and fully-open positions, means producing a second signal related to the engine operating condition, such as engine intake air flow per revolution of the engine, and means for judging the position of the throttle valve based on the first and second signals.

The throttle switch includes a rotary detector member adapted to be rotated in accordance with the rotation of the engine throttle valve and having a guide portion extending substantially in the direction of rotation of the rotary detector member and having a section offset radially relative to the direction of rotation of the rotary detector member, a movable contact adapted to be guided by the guide portion and movable in the radial direction of the rotary detector member when the latter is rotated and a stationary contact disposed in opposed relationship to the movable contact. The movable and stationary contacts have a first open position in which the two contacts are spaced apart and a second closed position in which the two contacts are closed to close an electrical circuit thereby to produce the first signal. The two positions of the two contacts are changed over when the rotary detector member has been rotated to one of two different predetermined rotational positions.

The above and other objects, features and advantages of the invention will be made more apparent by the following description with reference to the accompanying drawings.

DESCRIPTION OF THE PREFERRED EMBODIMENT

Figure 1:
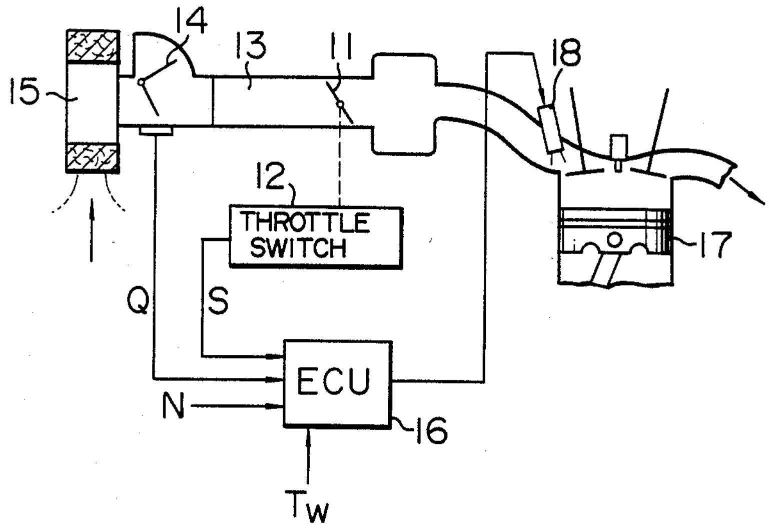
FIG. 1 is a schematic illustration of an internal combustion engine incorporating a throttle valve position detecting system of the invention.

Referring first to FIG. 1, an intake pipe 13 extending from an air cleaner 15 is connected to an internal combustion engine 17. The intake pipe 13 contains an air flow meter 14 for measuring the air flow rate, a throttle valve 11 disposed downstream of the air flow meter 14, and a fuel injector 18 disposed downstream of the throttle valve 11. A throttle switch 12 is operatively connected to the throttle valve 11 and electrically connected to an ECU 16 to emit a throttle position signal S to the ECU 16. The ECU receives other various signals such as an intake air flow rate signal Q from the air flow meter signal 14, an engine speed signal N, and an engine cooling water temperature signal Tw. Upon receipt of these signals, the ECU controls the duration and timing of electric supply to the injector 18.

An explanation will be made hereinunder as to the throttle switch 12 with specific reference to FIG. 2.

The throttle switch 12 has a rotor 201 constituting a rotary detector member and made of a plastic material such as polyamide resin. The rotor 201 is operatively connected to the throttle valve 11 such that it rotates in accordance with the rotation of a throttle valve shaft. The rotor 201 is formed therein with a guide groove 202 constituting a guide means. The guide groove 202 has an elongated arcuate form extending substantially in the circumferential direction and having a portion which is offset radially inwardly. Thus, the guide groove has two end portions and an intermediate portion which is offset radially inwardly from the end portions. The two end portions correspond to the throttle fully-open position and throttle fully-closed position, respectively. The rotor 201 is mounted on a base plate 205 for rotation as indicated by arrows and is formed in its central portion with a throttle shaft hole. The throttle shaft carrying the throttle valve 11 extends through this throttle shaft hole and fixedly connected with the rotor 201. A fixed member 206 made of a plastic material is secured to the base plate 205. The member 206 is provided at its lower side with two lugs 207 and 208 which are formed integrally therewith by molding. First and second contact carrier leaf springs 209 and 210 (referred to as "first and second leaf springs" hereinunder) are secured at their upper ends to lugs 208 and 207, respectively. The first leaf spring 209 carries at its free end a stationary contact 204 which is used for the detection of both of the throttle valve fully-closed position and fully-opened position. The second leaf spring 210 is provided on its free end with a movable contact 203 which is adapted to be moved in the radial direction along the guide groove 202 when the rotor 201 rotates. The movable contact 203 is a cylindrical member of a size greater than the width of the second leaf spring 210 and mounted thereon so that one end of the cylindrical movable contact 203 is received in and guided by the guide groove 202.

The operation of this throttle switch 12 is as follows: The rotation of the throttle valve 11 to its fully-closed position causes a clockwise rotation of the rotor 201 as viewed in FIG. 2, so that the movable contact 203 on the end of the second leaf spring 210 is guided by the guide groove 20 and moved radially outwardly, while resiliently deflecting the leaf spring 210 radially outwardly. When the throttle valve 11 reaches the fully-closed position, the movable contact 203 contacts the stationary contact 204 thus closing a circuit, as shown in FIG. 3A.

Figure 2:
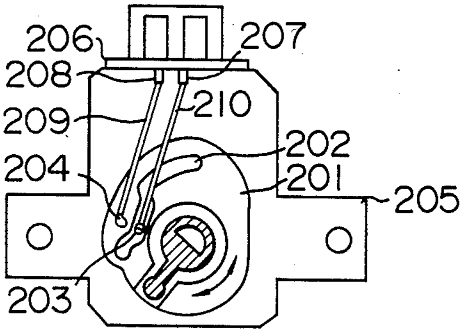
FIG. 2 is a front elevational view of a throttle switch incorporated in an embodiment of the throttle valve position detecting system in accordance with the invention.
Figure 3A:
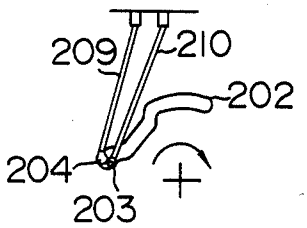
FIG. 3A is a schematic front elevational view of the throttle switch when it is in a position in which the throttle valve is fully closed.

Conversely, the rotation of the throttle valve 11 toward the open position causes a counter-clockwise rotation of the rotor 201 as viewed in FIG. 2. Consequently, the movable contact 203 is moved radially inwardly as it is guided by the guide groove 202. When the rotor 201 has rotated a predetermined angle, e.g., 2°, from the position corresponding to the throttle fully-closed position, the movable contact 203 is separated from the stationary contact 204.

Figure 3B:
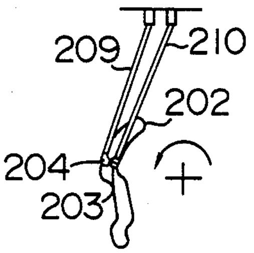
FIG. 3B is a schematic front elevational view of the throttle switch when in another position in which the throttle valve is fully opened.

When the throttle valve 11 reaches an open position which is angularly spaced 50° from the fully closed position, the rotor 201 reaches a position shown in FIG. 3B. During this rotation, the movable contact 203 is moved again radially outwardly along the guide groove 202 while deflecting the leaf spring 210. When the rotor reaches the position shown in FIG. 3B, the movable contact 203 again makes contact with the stationary contact 204 this closing the circuit.

It will be understood that the movable contact 203 makes contact with the stationary contact when the throttle valve 11 is both in the fully-opened position and in the fully-closed position. Therefore, it is necessary to employ a means for judging whether the throttle valve is in the fully-closed position or in the fully-opened position when the circuit is closed by the mutual contact between the movable and stationary contacts 203 and 204. The judging means will be described hereinunder.

Figure 4:
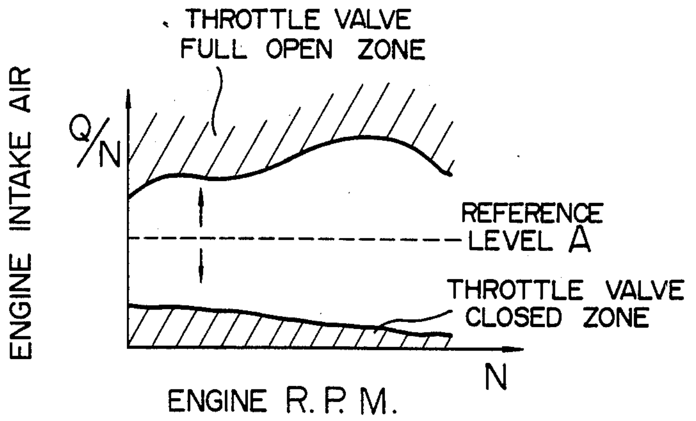
FIG. 4 is a graph showing changes of engine intake air per engine revolution relative to the engine speed when the throttle valve is fully closed and fully opened, respectively.

As stated before, the ECU 16 receives various signals such as the throttle valve position signal S, intake air flow rate signal Q, engine speed signal N, engine cooling water temperature Tw and so forth. It has been well known in the art that the quantity of air sucked into the engine per revolution, i.e., the ratio Q/N, which is obtained when the throttle valve 11 is fully closed, is less than $\frac{1}{3}$ of that obtained when the throttle valve is fully opened. In view of this fact, a reference level A of the ratio Q/N is suitably selected as shown in FIG. 4 and a judgement is made as to whether the measured ratio Q/N is below or above this reference level A. Namely, when the measured value Q/N is below the reference level A when the circuit is closed by the contacts 203 and 204, the throttle valve 11 is judged to be in the fully-closed position, whereas, when the reference level A is exceeded by the measured ratio Q/N, the throttle valve is judged to be in the fully-opened position.

Figure 5:
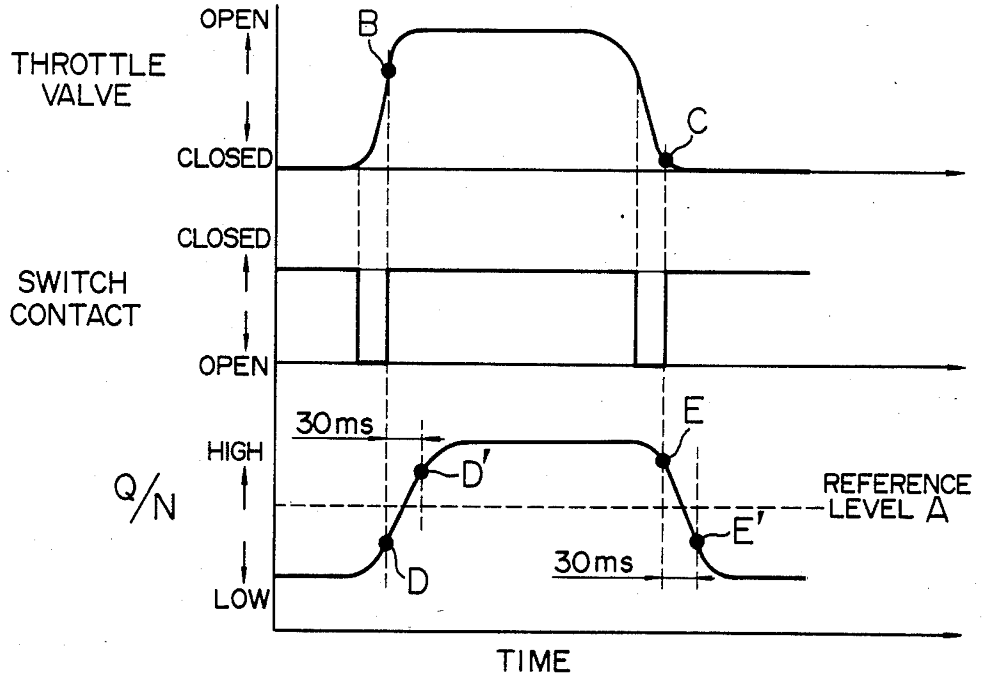
FIG. 5 is a time chart showing the change in the positions of the contacts of the throttle switch and the change in the engine intake air per revolution, both relative to the change in the throttle valve positions.

When the throttle valve 11 is quickly opened from the fully-closed position, the change in the ratio Q/N is delayed behind the change in the throttle valve position as shown in FIG. 5. Therefore, when the throttle valve has been opened to a position B shown in FIG. 5, the ratio Q/N represented by a level D is still below the reference level A, so that a wrong judgement would be made which leads to the production of a signal representing that the throttle valve is still in the fully-closed position. A similar wrong judgement would also be made when the throttle valve 11 is quickly closed from the fully-opened position. Namely, when the throttle valve has reached an almost fully-closed position indicated by C, the ratio Q/N as measured is still higher than the reference level A, so that a wrong judgement would be made which allows generation of a signal representing that the throttle valve is still in the fully-opened position.

In order to obviate the wrong judgements, the comparison of the actually measured ratio Q/N with the reference level A is conducted after the lapse of a predetermined time, e.g., 30 ms, from the moment at which the circuit is closed by the mutual contact between the movable and stationary contacts 203 and 204. Thus, in the described embodiment, the judgement is made when the comparison is conducted at a moment D' during the opening of the throttle valve and at a moment E' during the closing of the throttle valve. A signal produced in accordance with the result of the judgement is sent to the fuel injector 18 so as to control the fuel injection.

Figure 6:
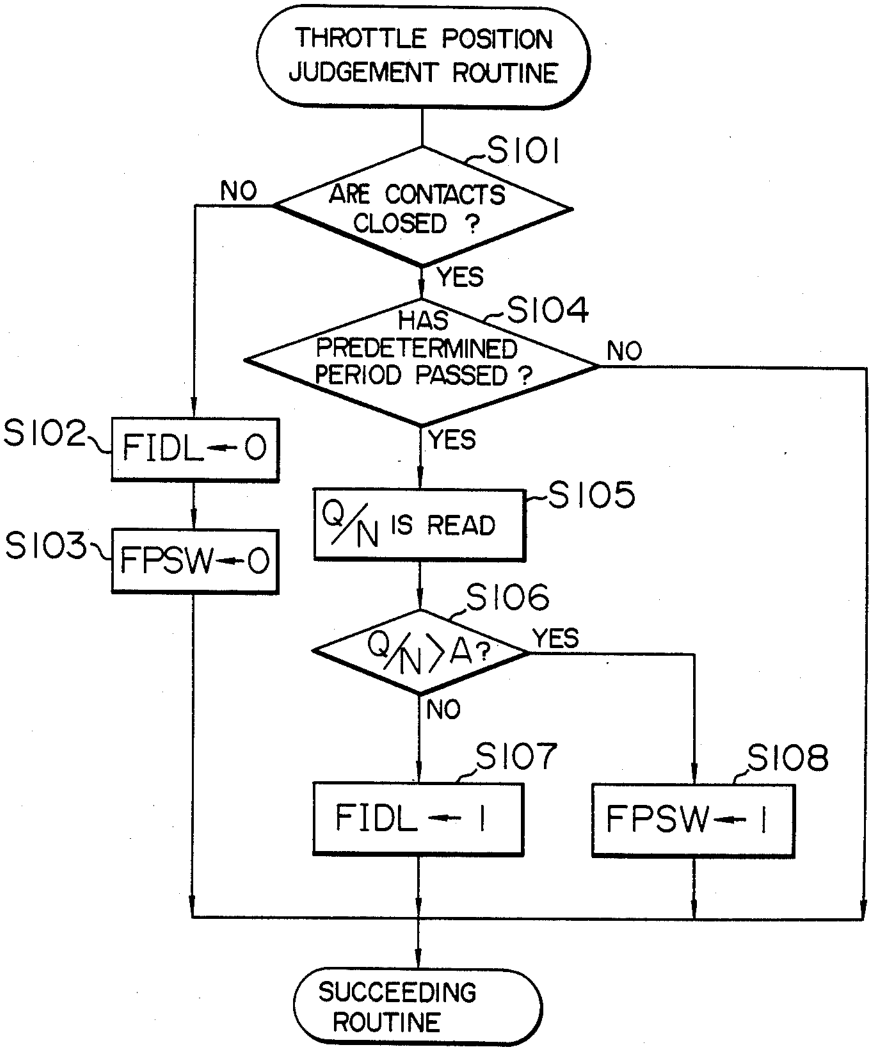
FIG. 6 is a flow chart showing the process in which a judgement conducted in an embodiment of the invention is performed by a microcomputer.

The judgement may be conducted by a microcomputer incorporated in the ECU 16. The flow of the judging process performed by such a microcomputer is shown in FIG. 6 by way of example.

In a step S101, a judgement is made as to whether the movable and stationary contacts are in contact with each other, i.e., whether the electric circuit is closed or not. If the result of this judgement is "NO", i.e., if the circuit is not closed, it is judged that the throttle valve is neither in the fully-opened position nor in the fully-closed position, and the process proceeds to the next routine after setting down a full-close detection flag (FIDL) in a step A102 and setting down a full open detection flag (FPSW) in a step S103. When the answer obtained in the step S101 is "YES", i.e., when the closing of the electric circuit is judged, the lapse of the aforementioned predetermined time period is confirmed in a step 104. After the confirmation, the process proceeds to a step S105 in which the ratio Q/N is read and the thus read ratio Q/N is compared with the predetermined reference level A in a step S106. When the read value of the ratio Q/N is smaller than the reference level A, the process proceeds to a step S107 in which the full close detection flag is set up. However, when the reference level A is exceeded by the ratio Q/N, the process proceeds to a step S108 in which the full open detection flag is set up. In either case, the process then proceeds to the next routine.

With this arrangement, it is thus possible to judge whether the throttle valve is in the fully-opened position or in the fully-closed position when the electric circuit is closed.

In the described embodiment, the ratio Q/N, i.e., the quantity of air sucked into the engine per revolution, is used as the index for judgement of the positions of the throttle valve 11. This, however, is not exclusive and various other factors can be used as the index for the judgement. For instance, the judgement can be made by measuring the variable manifold vacuum and comparing the measured level of the vacuum with a reference level in the comparing step S106 of the process shown in FIG. 6.

As has been described, according to the invention, a throttle valve position detecting system is composed of two major parts; namely, a throttle switch having a single stationary contact and a single movable contact movable in accordance with the rotation of a rotary detector member rotatable with the throttle valve, the movable contact being adapted to be brought into contact with the stationary contact at two different rotational positions of the rotary detector member, and a judging means adapted to make a judgement of the position of the throttle valve based on the state of contact between the movable and stationary contacts and also on a signal which is related to the condition of operation of the engine.

This throttle valve position detecting system offers advantages that the construction of the throttle switch is simplified thereby facilitating easy production and reducing the cost of manufacture. Furthermore, the reduction in size of the throttle switch permits a reduction in the weight and also in the space taken by the throttle switch when mounted. The size of the connector can also be reduced because the number of terminals is reduced by one. For the same reason, the number of the electric lines between the throttle switch and the ECU can be reduced to two.

What is claimed is:

1. An engine throttle valve position detecting system including:

a throttle switch including a rotary detector member adapted to be rotated in accordance with the rotation of an engine throttle valve and having a guide portion extending substantially in the direction of rotation of said rotary detector member and having a section offset radially relative to the direction of rotation of said rotary detector member, a movable contact adapted to be guided by said guide portion and movable in the radial direction of said rotary detector member when the latter is rotated and a stationary contact disposed in opposed relationship to said movable contact, said stationary and movable contacts having opened and closed positions which are changed over at two different predetermined rotational positions of said rotary detector member;

means producing a signal related to the engine operating condition; and means for judging the position of said throttle valve based on one of the positions of said movable and stationary contacts and on said engine operating condition signal.

2. An engine throttle valve position detecting system according to claim 1, wherein said signal represents the quantity of air sucked into the engine per revolution thereof.

3. An engine throttle valve position detecting system according to claim 1, wherein said signal represents the pressure in an intake manifold of the engine.

4. An engine throttle valve position detecting system according to claim 1, wherein said judging means are arranged to judge as to whether said throttle valve is closed or opened.

5. An engine throttle valve position detecting system according to claim 1, wherein said judging means are arranged to judge the throttle valve position after the lapse of a predetermined time period from the moment when one of the positions of said movable and stationary contacts is changed over to the other.

6. An engine throttle valve position detecting system according to claim 1, wherein said guide portion is formed by a generally arcuate groove formed in said rotary detector member, said movable contact being partially received in said arcuate groove and mounted on an end of a resilient member secured at the other end to a stationary member of the engine.

* * * * *